(12) United States Patent
Lee (10) Patent No.: US 7,791,818 B2
(45) Date of Patent: Sep. 7, 2010

(54) ZOOM LENS SYSTEM

(75) Inventor: Ki-woo Lee, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/316,642

(22) Filed: Dec. 15, 2008

(65) Prior Publication Data

US 2009/0161228 A1 Jun. 25, 2009

(30) Foreign Application Priority Data

Dec. 24, 2007 (KR) ...................... 10-2007-0136590

(51) Int. Cl.
*G02B 15/14* (2006.01)
*G02B 27/64* (2006.01)
(52) U.S. Cl. ...................... 359/687; 359/557
(58) Field of Classification Search ................. 359/676, 359/678, 683–684, 686–687, 554, 557; 348/240.99–240.3; 396/72–88
See application file for complete search history.

(56) References Cited

U.S. PATENT DOCUMENTS 6,124,983 A * 9/2000 Yahagi et al. ............... 359/687

7,113,346 B1 * 9/2006 Souma et al. ............... 359/687
2007/0031134 A1 * 2/2007 Kuroda et al. ............... 396/55

FOREIGN PATENT DOCUMENTS

| JP | 2006-113363 A | 4/2006 |
| JP | 2006-267862 A | 10/2006 |
| JP | 2006-343622 A | 12/2006 |
| JP | 2007-033879 A | 2/2007 |
| JP | 2007-140158 A | 6/2007 |
| JP | 2007-219316 A | 8/2007 |
| WO | WO 2007129677 A1 * | 11/2007 |

* cited by examiner

*Primary Examiner*—Darryl J Collins
*Assistant Examiner*—Zachary Wilkes
(74) *Attorney, Agent, or Firm*—Drinker Biddle & Reath LLP

(57) ABSTRACT

A zoom lens system includes, arranged sequentially from an object side, a first lens group including at least one reflective optical member changing the optical path of an incident light ray, and having positive refractive power; a second lens group having negative refractive power; a third lens group having positive refractive power; and a fourth lens group having positive refractive power, and during a magnification change from a wide-angle position to a telephoto position, the first lens group and the third lens group are not moved, the second lens group is moved from the object side towards an image side, and the fourth lens group is linearly moved from the image side towards the object side.

9 Claims, 12 Drawing Sheets

ZOOM LENS SYSTEM

CROSS-REFERENCE TO RELATED PATENT APPLICATION

This application claims the benefit of Korean Patent Application No. 10-2007-0136590, filed on Dec. 24, 2007, in the Korean Intellectual Property Office, the disclosure of which is incorporated herein in its entirety by reference.

BACKGROUND OF THE INVENTION

1. Field of the Invention

The present invention relates to a refracting zoom lens system having a shake correction function.

2. Description of the Related Art

Recently, as imaging devices such as a charge-coupled device (CCD) and complementary metal-oxide semiconductor (CMOS) devices have been miniaturized, there is an increased demand for compact and slim electronic devices using the smaller imaging devices. Slim and compact cameras are classified as a slider type in which a zoom lens protrudes out of the camera body during use and is kept inside the camera body when not used, and a refraction type in which a reflector such as a prism is used so that a lens system has a reduced thickness.

However, the slider type can be miniaturized by reducing the entire length of the barrel when powered off, and thus, it is difficult to embody the slider type, which is much slimmer than a conventional camera, by using a high magnification zoom lens. Moreover, it takes a relatively long time for the slider type to move from an initial position to an operating position when the camera is powered on. In addition, a lens group that is closest to an object side protrudes out of the camera, and thus the slider type is more sensitive to impact, debris and water. Accordingly, there is a need for an optical system of a refraction type that changes the optical path. The thickness of such refraction type optical system that includes a prism can be reduced by changing the optical path of light in the middle of the optical system by 90° using a prism. Accordingly, the demand for shake correction of a compact camera is further increased.

Conventionally, the movement of an image surface, which is caused by shake occurring during photographing, is corrected using a fourth lens group. However, since the fourth lens group has a low imaging magnification, the fourth lens group needs to be moved significantly in order to correct for the shake. Thus, the resolving power of an imaging device can be reduced. Accordingly, in order to maintain the resolution of an optical system, the configuration of the lens groups becomes complicated and the number of required lenses is increased.

SUMMARY OF THE INVENTION

The present invention provides a slim and compact refracting zoom lens system.

According to an aspect of the present invention, there is provided a zoom lens system comprising: a first lens group including at least one reflective optical member changing the optical path of an incident light ray, and having positive refractive power; a second lens group having negative refractive power; a third lens group having positive refractive power; and a fourth lens group having positive refractive power, wherein the first, second, third and fourth lens groups are sequentially arranged from an object side, and during a magnification change from a wide-angle position to a telephoto position, the first lens group and the third lens group are not moved, the second lens group is moved from the object side towards an image side, and the fourth lens group is linearly moved from the image side towards the object side.

The third lens group may be moved in a direction perpendicular to the optical axis to perform a shake correction function.

The fourth lens group may comprise a lens having negative refractive power, a lens having first positive refractive power, and a lens having second positive refractive power, wherein the lens may be sequentially arranged from the object side.

The fourth lens group may be configured so that the lens having negative refractive power and the lens having first positive refractive power are cemented as a doublet lens.

BRIEF DESCRIPTION OF THE DRAWINGS

The above and other features and advantages of the present invention will become more apparent from the following detailed description of exemplary embodiments thereof with reference to the attached drawings in which.

DETAILED DESCRIPTION

Hereinafter, a zoom lens system will be described with regard to exemplary embodiments of the invention with reference to the attached drawings.

Figure 1:
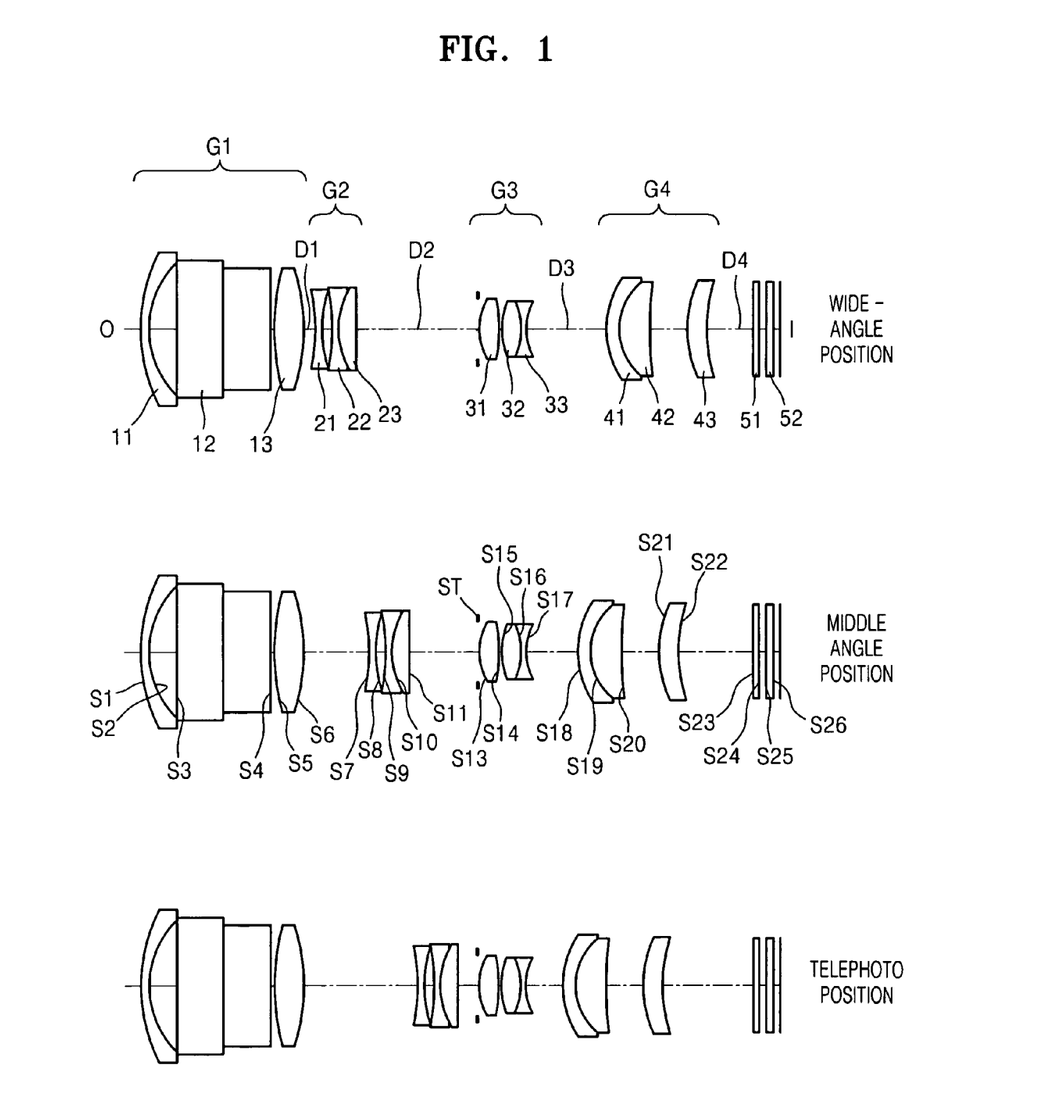
FIG. 1 is a cross-sectional view illustrating a zoom lens at a wide-angle position, a middle angle position and a telephoto position, according to an embodiment of the present invention.

Referring to FIG. 1, the zoom lens includes a first lens group G1 having positive refractive power, a second lens group G2 having negative refractive power, a third lens group G3 having positive refractive power, and a fourth lens group G4 having positive refractive power. The first lens group G1 includes at least one reflective optical member changing the optical axis of an incident light ray. For example, the first lens group G1 includes a first reflective optical member 12 that is designed so as to refract an incident light ray by 90 degrees with respect to the optical axis of the incident light ray, and the first reflective optical member 12 may include a prism or a reflective mirror.

During a magnification change from a wide-angle position to a telephoto position, the first lens group G1 and the third lens group G3 are not moved, the second lens group G2 is moved from the object "O" side towards the image "I" side, and the fourth lens group G4 is moved from the image "I" side towards the object "O" side. The fourth lens group G4 performs focusing that is required due to the change in the distance between the object "O" and the zoom lens. In order to correct for the shake of the image surface "I" due to a shake occurring when the object "O" is photographed, the third lens group G3 may be moved in a direction perpendicular to the optical axis.

According to the present invention, the zoom lens has the configuration of first to fourth lens groups G1 to G4 respectively having positive, negative, positive and positive refractive powers, and thus the number of lenses is reduced. In addition, the second lens group G2 and the fourth lens group G4 are moved when zooming is performed, and the fourth lens group G4 performs focusing in order to correct for the movement of the image surface "I" due to a change of object distance. Thus, the lens groups can be driven using only two motors, thereby miniaturizing the zoom lens system.

For example, the first lens group G1 includes a first lens 11 having negative refractive power, the first reflective optical member 12 and a second lens 13 having positive refractive power.

The second lens group G2 may include a third lens 21 having negative refractive power, a fourth lens 22 having negative refractive power and a fifth lens 23 having positive refractive power. The third lens 21 and the fourth lens 22 may be configured as a doublet lens.

The third lens group G3 may include an aperture stop ST, a sixth lens 31 having positive refractive power, a seventh lens 32 having positive refractive power and an eighth lens 33 having negative refractive power. The seventh lens 32 and the eighth lens 33 may be configured as a doublet lens. The fourth lens group G4 may include a ninth lens 41 having negative refractive power, a tenth lens 42 having positive refractive power and an eleventh element 43 having positive refractive power, wherein the ninth lens 41, the tenth lens 42 and the eleventh lens 43 are sequentially arranged from the object "O" side. The ninth lens 41 and the tenth lens 42 may be configured as a doublet lens. The eleventh lens 43 may be configured as a plastic aspherical lens.

In conventional lens systems, in order to reduce the overall length of the zoom lens system, the fourth lens group G4 follows a parabolic motion so as to initially move towards the object "O" side and then move towards the image "I" side once the middle angle position is reached, during the magnification change from the wide-angle position to the telephoto position. However, according to the present invention, the fourth lens group G4 follows a linear motion while reducing the overall length of a zoom lens system, and thus reducing the complexity to control the movement of lens groups. To achieve this, the magnifications of the third lens group G3 and the fourth lens group G4 are increased such that the third lens group G3 may have a magnification m3 in the range of 320 to 1100.

When movement such as a shake of a camera occurs during photographing using a zoom lens, a shake of an image occurs, thereby deteriorating image quality. The shake of the image can be corrected by moving a part of the optical system of the zoom lens in a direction perpendicular to the optical axis according to a value output by a shake detector.

According to the present invention, optical shake correction can be performed using the third lens group G3, which has relatively high magnification. In addition, the doublet lens of the third lens group G3 may be formed of a high-refractive and low-dispersive material and thus lateral chromatic aberration can be corrected, wherein the lateral chromatic aberration is generated when the third lens group G3 is moved in a direction perpendicular to the optical axis. A lens (the sixth lens 31) having positive refractive power at the object "O" side of the third lens group G3 may be formed of a material having high-refractive index so that complexity of the aspherical shape of the lens, and coma aberration can be reduced. Then, the lateral chromatic aberration can be reduced using the doublet lens of the third lens group G3 having positive and negative refractive powers.

Each of the first through fourth lens groups G1, G2, G3 and G4 may include at least one aspherical lens. In addition, each of the second through fourth lens groups G2, G3 and G4 may include a doublet lens.

The zoom lens system according to the current embodiment satisfies the following condition.

$$1.34 < R1/R2 < 1.44 \quad \text{[Inequality 1]}$$

In Inequality 1, $R1$ is the radius of curvature of the first surface of the eighth lens 41 having negative refractive power from the object "O" side, and $R2$ is the radius of curvature of the second surface of the eighth lens 41 from the object "O" side. When $R1/R2$ is less or equal to the lower limit of Inequality 1, the refractive power of the eighth lens 41 increases. This is advantageous in miniaturizing a lens makes fabrication difficult. The performance of the zoom lens system is more sensitive to the concentricity of the first and second surfaces, and thus it is difficult to manufacture the zoom lens system. When $R1/R2$ is greater than or equal to the upper limit of Inequality 1, the refractive power of the eighth lens 41 decreases. Thus, during zooming, it is difficult to miniaturize the zoom lens system since the distance of the fourth lens group G4 needs to move increases.

In addition, the fourth lens group G4 satisfies the following condition.

$$-1.88 < f10/f1011 < -1.04 \quad \text{[Inequality 2]}$$

In Inequality 2, $f10$ is the focal length of the first lens (e.g., the eighth lens 41) of a doublet lens from the object side "O" in the fourth lens group G4, and $f1011$ is the focal length of the doublet lens included in the fourth lens group G4. Under the lower limit, the focal length of the first lens (e.g., the eighth lens 41) from the object side "O" is greater than the focal length of the doublet lens, and the refractive power of a lens having a small vd is reduced. Thus, significant lateral chromatic aberration is generated, and it is difficult achieve high resolution as can be realized according to the present invention. Above the upper limit, the focal length of the first lens from the object side "O" (e.g., the eighth lens 41) is smaller than the focal length of the doublet lens, and the refractive power of the lens having a small vd is increased. Thus, spherical aberration is increased, and it is difficult to fabricate the first lens from the object side "O".

The aspherical surface in the current embodiment is defined as follows. Assuming that an optical axis direction is an X axis direction, a direction perpendicular to the optical axis direction is a Y axis direction, and the direction in which a light ray proceeds is positive, the shape of the aspherical surface of the zoom lens according to the current embodiment can be expressed by the following equation, where x is the distance from the apex of the lens in the optical axis direction, h is the distance in the direction perpendicular to the optical axis, K is a conic constant, A, B, C, and D are aspherical coefficients, and c is the reciprocal (1/R) of the radius of curvature at the apex of the lens.

$$x = \frac{cy^2}{1 + \sqrt{1-(K+1)c^2h^2}} + Ah^4 + Bh^6 + Ch^8 + Dh^{10}$$ [Equation 3]

The present invention includes lenses according to optimal conditions to embody the miniaturization of a zoom lens according to embodiments through the following various designs.

In the following description, f is the combined focal length of the overall zoom lens system, Fno is an F number, 2w is the viewing angle, R is the radius of curvature, Dn is the thickness of the center of a lens or an interval between lens, an nd is the refractivity index of the material of a lens, and Vd is an Abbe number. Also, ST is an aperture stop, D1, D2, D3 and D4 are variable distances, OBJ is an object surface, IMG is an image surface, and a reference mark with * is an aspherical surface. In the drawings illustrating the embodiments, numerals of each embodiment correspond to reference numerals of each lens, and lens constituting each respective lens group have the same reference numeral.

Embodiment 1

FIG. 1 is a cross-sectional view illustrating the zoom lens at a wide-angle position, a middle angle position and a telephoto position, according to an embodiment of the present invention, and reference numerals 51 and 52 denote filters.

| f; 6.8 mm~11.58 mm~30.64 mm 2ω; 60.6°~36.0°~21.5° | | | | |
|---|---|---|---|---|
| | R | Dn | nd | vd |
| OBJ: | INFINITY | INFINITY | | |
| S1: | 15.43400 | 0.60 | 1.92286 | 20.88 |
| S2: | 8.07700 | 2.16 | | |
| S3: | INFINITY | 7.60 | 1.83400 | 37.34 |
| S4: | INFINITY | 0.30 | | |
| *S5: | 19.66020 | 2.29 | 1.74330 | 49.33 |
| *S6: | −17.70944 | D1 | | |
| S7: | −27.60400 | 0.60 | 1.80610 | 40.73 |
| *S8: | 10.60800 | 0.77 | | |
| S9: | −14.51900 | 0.50 | 1.62299 | 58.12 |
| S10: | 7.52400 | 1.50 | 1.84666 | 23.78 |
| S11: | 78.61400 | D2 | | |
| S12(ST): | INFINITY | 0.30 | | |
| *S13: | 6.40757 | 1.52 | 1.80610 | 40.73 |
| S14: | −34.59600 | 0.29 | | |
| S15: | 9.51600 | 1.43 | 1.65844 | 50.84 |
| S16: | −8.28100 | 0.51 | 1.90366 | 31.3 |
| S17: | 4.96900 | D3 | | |
| S18: | 7.17100 | 1.00 | 1.92286 | 20.88 |
| S19: | 5.01800 | 2.47 | 1.51680 | 64.20 |
| S20: | 56.07400 | 2.98 | | |
| *S21: | 7.95411 | 1.65 | 1.51680 | 64.20 |
| S22: | 13.75700 | D4 | | |
| S23: | INFINITY | 0.50 | 1.51680 | 64.20 |
| S24: | INFINITY | 0.50 | | |
| S25: | INFINITY | 0.50 | 1.51680 | 64.20 |
| S26: | INFINITY | | | |

Table 1 shows variable distances D1, D2, D3 and D4 at a wide-angle position, a middle angle position and a telephoto position of the zoom lens according to the current embodiment.

TABLE 1

| Variable distance | Wide-angle position | Middle angle position | Telephoto angle position |
|---|---|---|---|
| D1 | 1.000 | 5.418 | 9.287 |
| D2 | 9.887 | 5.469 | 1.600 |
| D3 | 6.488 | 4.256 | 3.000 |
| D4 | 3.697 | 5.924 | 7.180 |

Table 2 shows the aspherical coefficients of the zoom lens according to the present embodiment.

TABLE 2

| aspherical coefficient | S5 | S6 | S8 | S13 | S21 |
|---|---|---|---|---|---|
| K | −1.09566E+00 | 3.47440E−01 | 1.36125E+00 | 2.27190E−02 | 1.65867E+00 |
| A | −2.93634E−05 | −2.97683E−05 | −1.00000E−04 | −3.20000E−04 | −7.23540E−04 |
| B | 3.20271E−06 | 2.83659E−06 | 4.11173E−06 | −3.62978E−06 | −2.42202E−05 |
| C | −1.26625E−07 | −1.23919E−07 | 4.43307E−08 | 7.21246E−08 | 9.82881E−07 |
| D | 1.58436E−09 | 1.64601E−09 | −1.94248E−09 | −1.32415E−08 | −7.08877E−08 |

Figure 2:
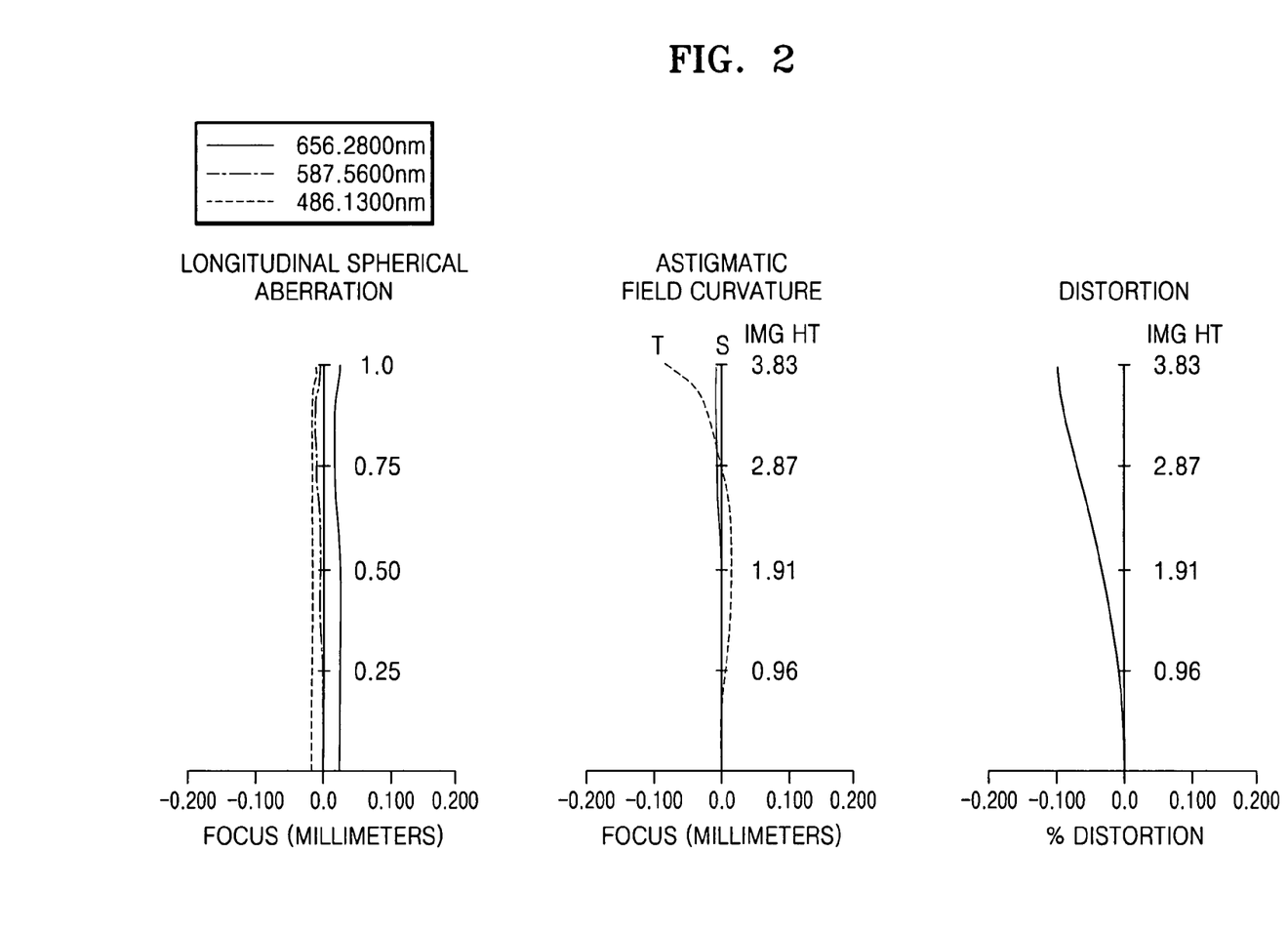
FIGS. 2, 3 and 4 illustrate the spherical aberration astigmatic, astigmatic field curvature, and distortion at a wide-angle position, a middle angle position and a telephoto position of the zoom lens of FIG. 1, respectively.
Figure 3:
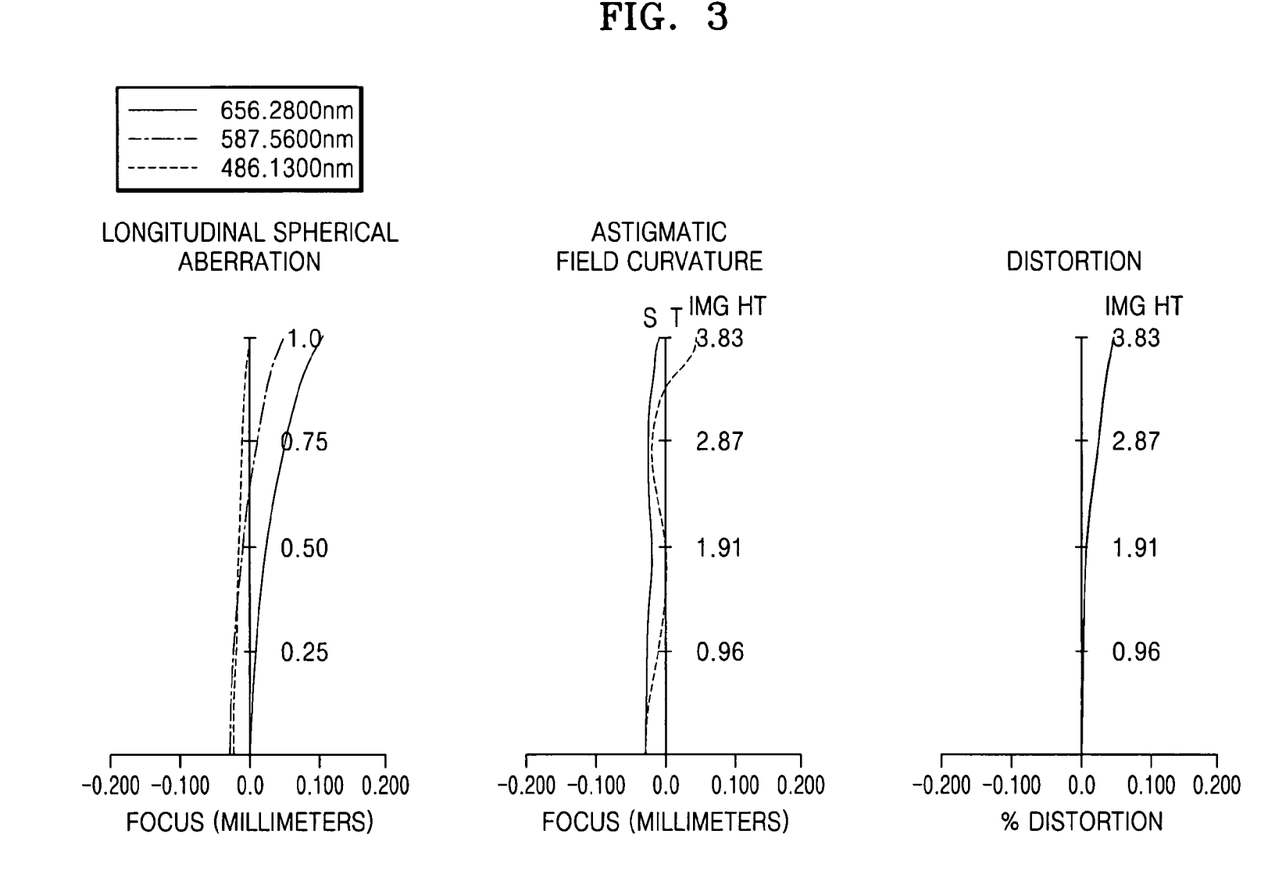
Figure 4:
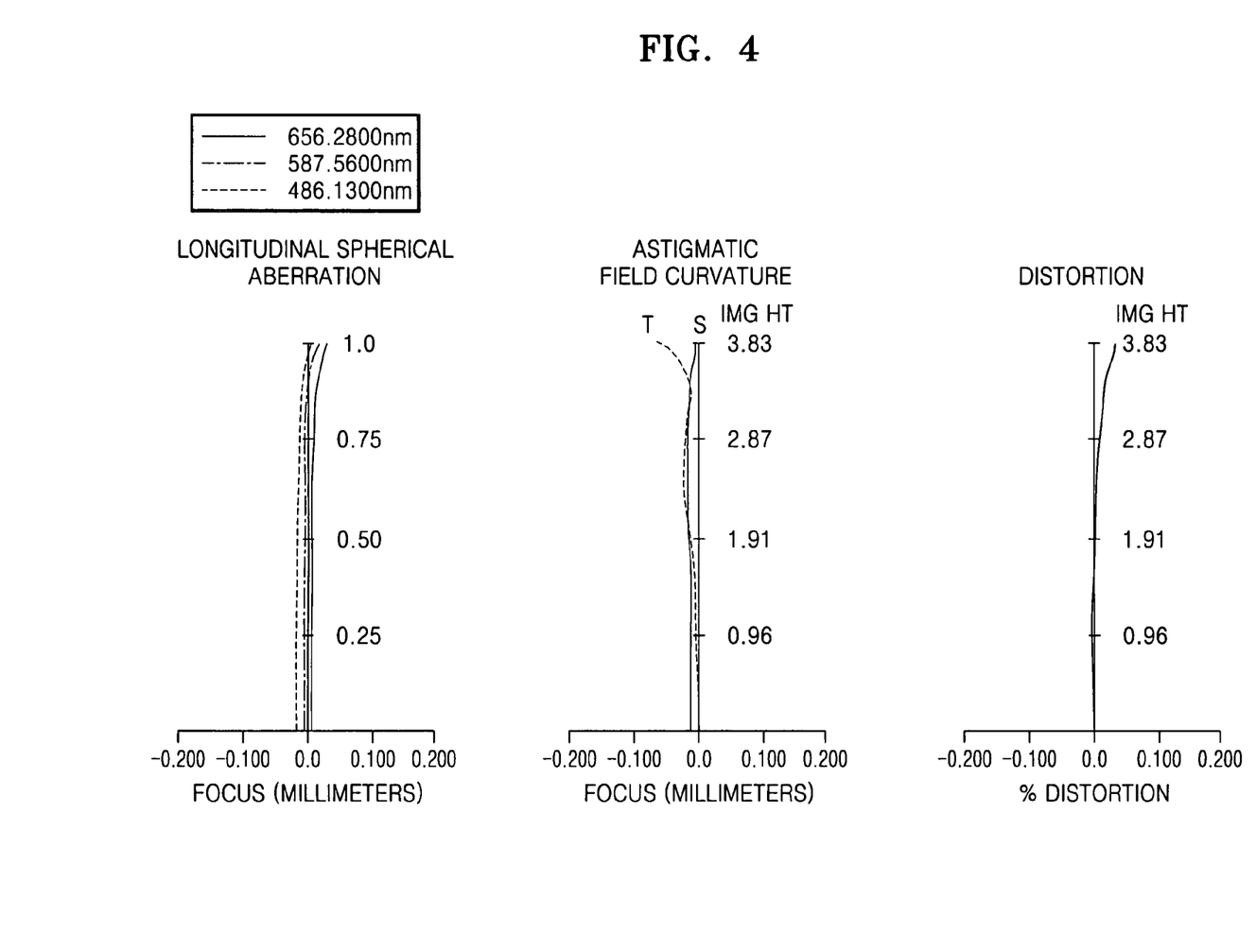

FIGS. 2, 3, and 4 illustrate the spherical aberration, astigmatic field curvature, and distortion at a wide-angle position, a middle angle position and a telephoto position of the zoom lens of FIG. 1, respectively. The astigmatic field curvature includes tangential astigmatic field curvature T and sagittal astigmatic field curvature S.

Embodiment 2

Figure 5:
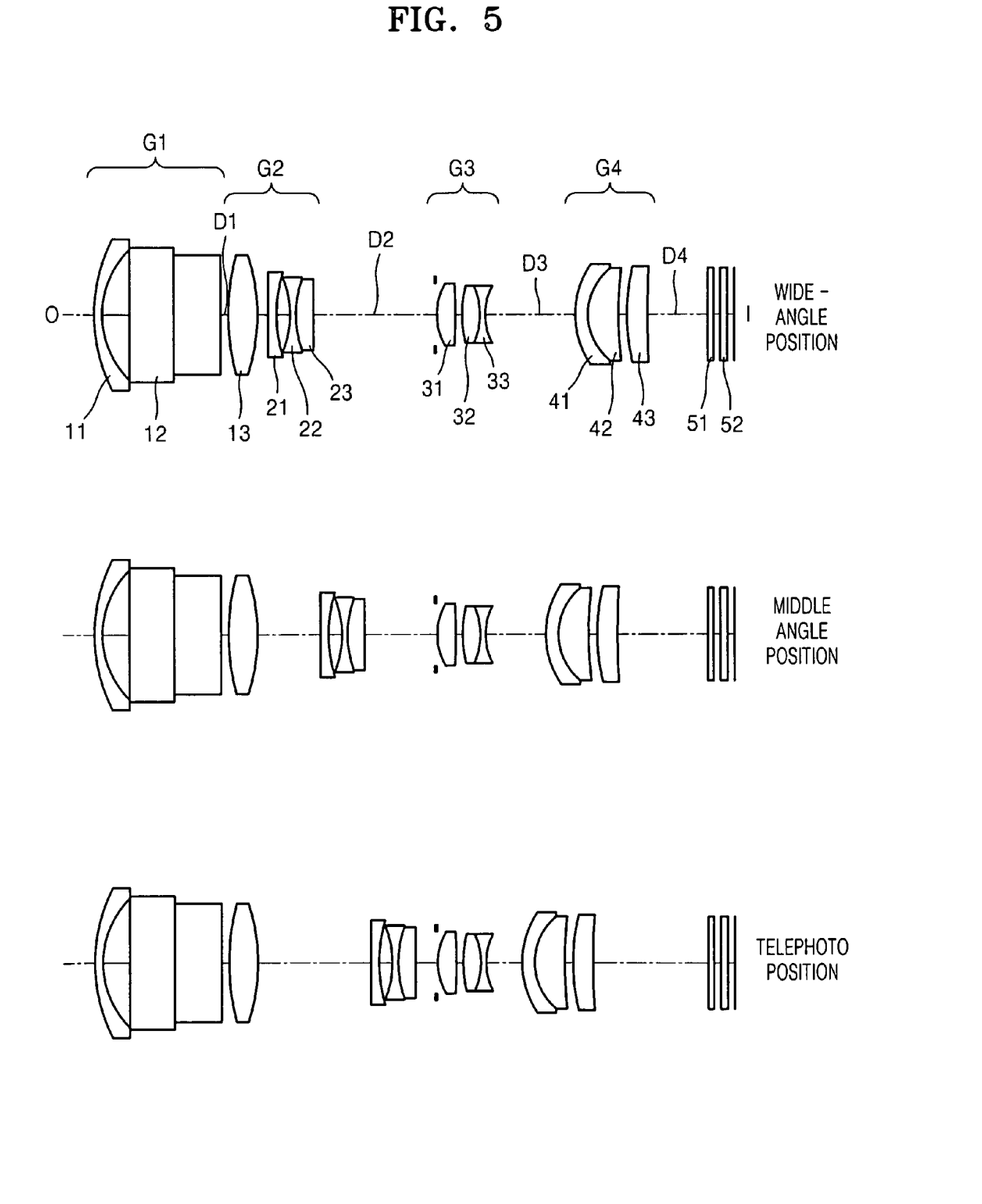
FIG. 5 is a cross-sectional view illustrating a zoom lens at a wide-angle position, a middle angle position and a telephoto position, according to another embodiment of the present invention.

FIG. 5 is a cross-sectional view illustrating the zoom lens at a wide-angle position, a middle angle position and a telephoto position, according to another embodiment of the present invention. The zoom lens includes first, second, third and fourth lens groups G1, G2, G3 and G4.

| f; 6.8 mm~11.58 mm~30.64 mm 2ω; 60.6°~36.0°~21.5° | | | | |
|---|---|---|---|---|
| | R | Dn | nd | vd |
| OBJ: | INFINITY | INFINITY | | |
| S1: | 17.98000 | 0.600 | 1.92286 | 20.88 |
| S2: | 8.49100 | 2.179 | | |
| S3: | INFINITY | 7.600 | 1.83400 | 37.34 |
| S4: | INFINITY | 0.300 | | |

-continued f; 6.8 mm~11.58 mm~30.64 mm
2ω; 60.6°~36.0°~21.5°

|  | R | Dn | nd | vd |
|---|---|---|---|---|
| *S5: | 17.93169 | 2.300 | 1.73968 | 49.00 |
| *S6: | −19.28619 | D1 |  |  |
| S7: | −81.10900 | 0.600 | 1.76802 | 49.24 |
| *S8: | 9.39800 | 1.034 |  |  |
| S9: | −10.38200 | 0.500 | 1.62299 | 58.12 |
| S10: | 9.22400 | 1.500 | 1.84666 | 23.78 |
| S11: | 362.69100 | D2 |  |  |
| S12(ST) | INFINITY | 0.300 |  |  |
| *S13: | 6.65307 | 1.500 | 1.80470 | 40.90 |
| S14: | −32.68848 | 0.458 |  |  |
| S15: | 8.49400 | 1.440 | 1.62299 | 58.12 |
| S16: | −8.49400 | 0.500 | 1.90366 | 31.32 |
| S17: | 5.10500 | D3 |  |  |
| S18: | 6.80200 | 1.000 | 1.92286 | 20.88 |
| S19: | 5.04400 | 2.480 | 1.48749 | 70.44 |
| S20: | 289.72200 | 0.359 |  |  |
| *S21: | 16.94758 | 1.650 | 1.51680 | 64.20 |
| S22: | 26.78800 | D4 |  |  |
| S23: | INFINITY | 0.500 | 1.51680 | 64.20 |
| S24: | INFINITY | 0.500 |  |  |
| S25: | INFINITY | 0.500 | 1.51680 | 64.20 |
| S26: | INFINITY |  |  |  |

Table 3 shows variable distances D1, D2, D3 and D4 at a wide-angle position, a middle angle position and a telephoto position of the zoom lens according to the current embodiment.

TABLE 3

| Variable distance | Wide-angle position | Middle angle position | Telephoto angle position |
|---|---|---|---|
| D1 | 1.000 | 5.158 | 9.124 |
| D2 | 9.724 | 5.567 | 1.600 |
| D3 | 7.504 | 5.065 | 3.000 |
| D4 | 4.965 | 7.405 | 9.470 |

Table 4 shows the aspherical coefficients of the zoom lens according to the present embodiment.

TABLE 4

| aspherical coefficient | S5 | S6 | S8 | S13 | S21 |
|---|---|---|---|---|---|
| K | −1.57321E+00 | 6.40397E−01 | 9.51831E−01 | 2.07307E−01 | 1.56799E+00 |
| A | −2.90644E−05 | −3.99596E−05 | −1.02319E−04 | −3.55737E−04 | −4.73378E−04 |
| B | 3.08338E−06 | 3.12028E−06 | 4.37818E−06 | −5.71541E−06 | 2.20418E−06 |
| C | −1.11897E−07 | −1.19171E−07 | 1.19927E−07 | 1.15206E−07 | −3.17810E−07 |
| D | 1.12166E−09 | 1.31711E−09 | 0.00000E+00 | −8.86327E−09 | 2.58779E−09 |

Figure 6:
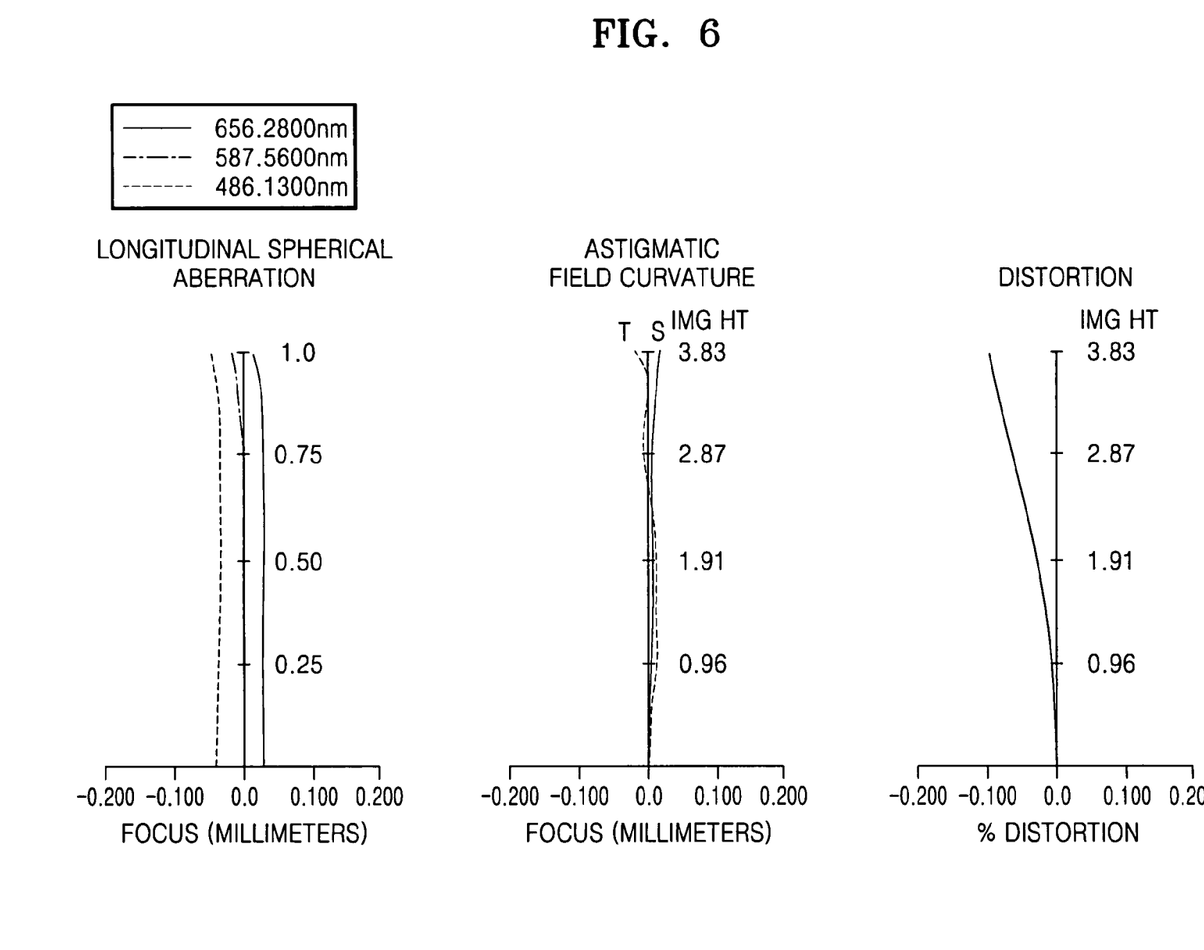
FIGS. 6, 7 and 8 illustrate the spherical aberration astigmatic, astigmatic field curvature, and distortion at a wide-angle position, a middle angle position and a telephoto position of the zoom lens of FIG. 5, respectively.
Figure 7:
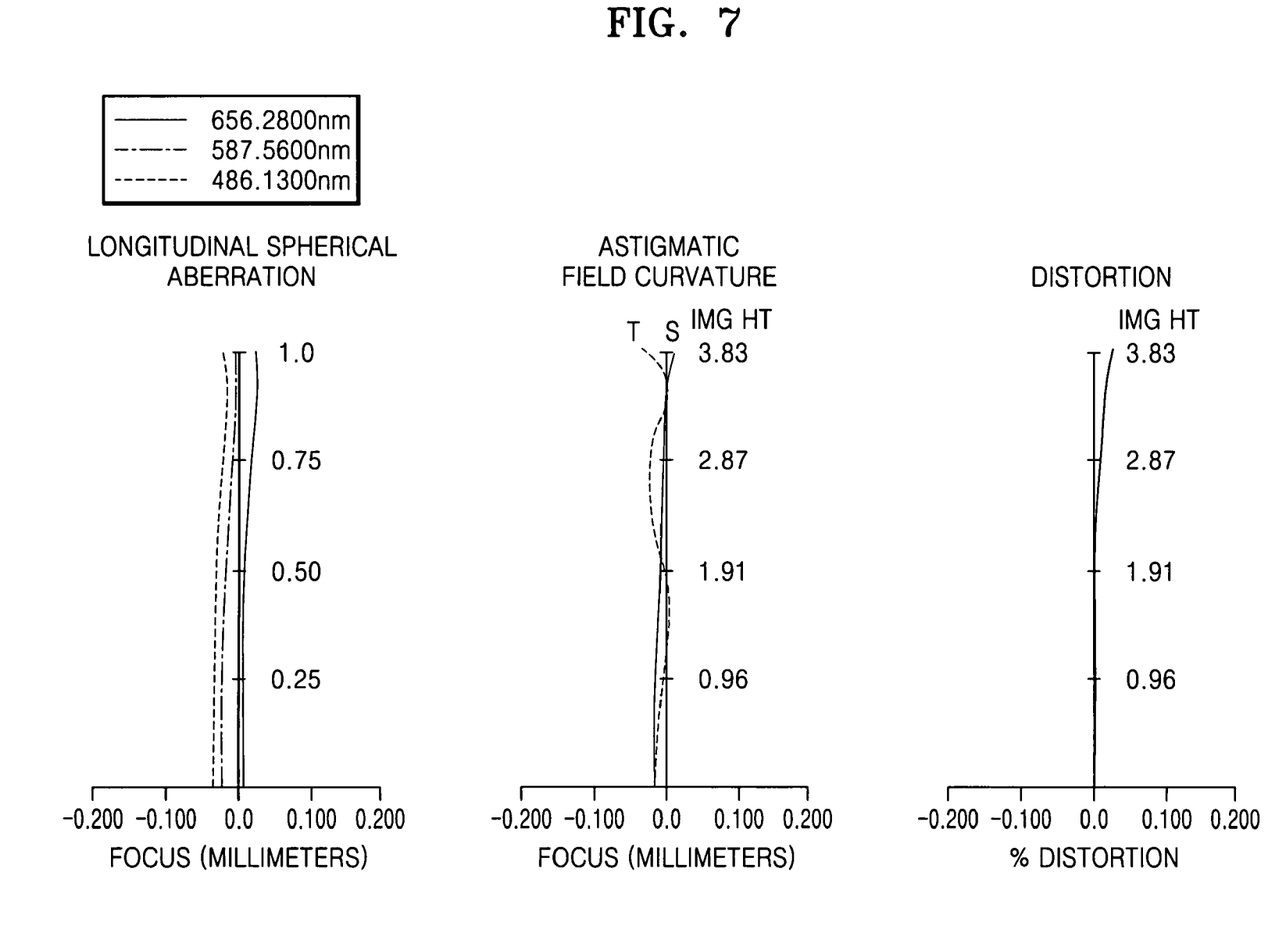
Figure 8:
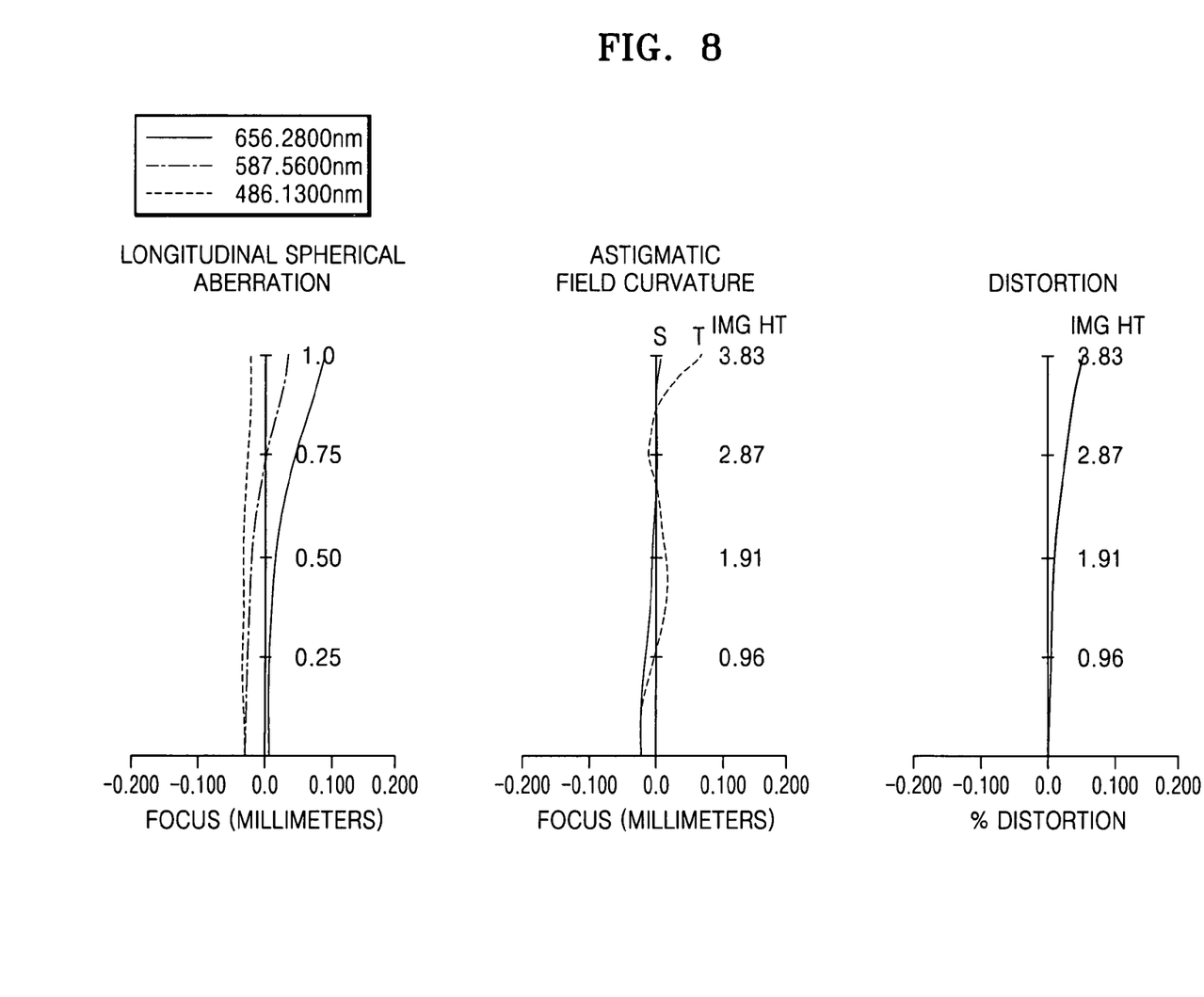

FIGS. 6, 7 and 8 illustrate the spherical aberration, astigmatic field curvature, and distortion at a wide-angle position, a middle angle position and a telephoto position of the zoom lens of FIG. 5, respectively.

Embodiment 3

Figure 9:
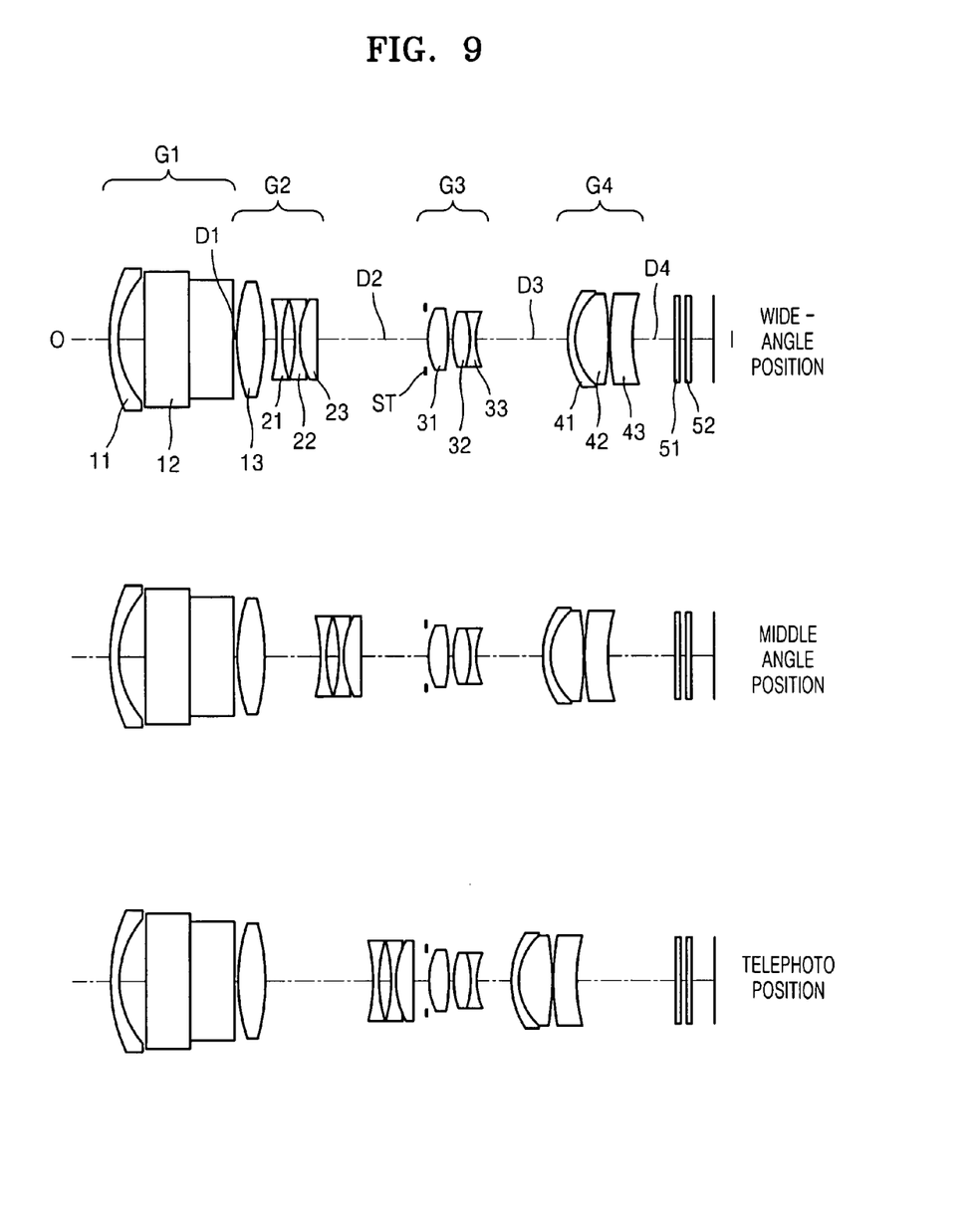
FIG. 9 is a cross-sectional view illustrating a zoom lens at a wide-angle position, a middle angle position and a telephoto position, according to another embodiment of the present invention.

FIG. 9 is a cross-sectional view illustrating the cases of a zoom lens at a wide-angle position, a middle angle position and a telephoto position, according to another embodiment of the present invention.

f; 6.9 mm~10.35 mm~19.67 mm
2ω; 60.6°~36.0°~21.5°

|  | R | Dn | nd | vd |
|---|---|---|---|---|
| OBJ: | INFINITY | INFINITY |  |  |
| S1: | 16.74487 | 0.620 | 1.92286 | 20.88 |
| S2: | 8.32722 | 2.220 |  |  |
| S3: | INFINITY | 7.500 | 1.83400 | 37.34 |
| S4: | INFINITY | 0.300 |  |  |
| *S5: | 18.69281 | 2.280 | 1.74330 | 49.33 |
| *S6: | −19.16466 | D1 |  |  |
| S7: | −30.87977 | 0.600 | 1.76802 | 49.24 |
| *S8: | 10.00673 | 0.895 |  |  |
| S9: | −14.83817 | 0.500 | 1.62280 | 56.91 |
| S10: | 7.46253 | 1.500 | 1.84666 | 23.78 |
| S11: | 55.41687 | D2 |  |  |
| S12(ST): | INFINITY | 0.300 |  |  |
| *S13: | 6.54046 | 1.500 | 1.80610 | 40.73 |
| S14: | −35.60971 | 0.540 |  |  |
| S15: | 8.17934 | 1.480 | 1.64000 | 60.20 |
| S16: | −6.62501 | 0.500 | 1.90366 | 31.32 |
| S17: | 5.07519 | D3 |  |  |
| S18: | 7.19606 | 0.690 | 1.84666 | 23.78 |
| S19: | 5.29454 | 2.697 | 1.51680 | 64.20 |
| S20: | −54.50314 | 0.150 |  |  |
| *S21: (Plastic ASP Lens) | 20.74980 | 2.034 | 1.53113 | 55.70 |
| S22: | 22.56161 | D4 |  |  |
| S23: | INFINITY | 0.500 | 1.51680 | 64.20 |
| S24: | INFINITY | 0.500 |  |  |
| S25: | INFINITY | 0.500 | 1.51680 | 64.20 |
| S26: | INFINITY |  |  |  |

Table 5 shows variable distances D1, D2, D3 and D4 at a wide-angle position, a middle angle position and a telephoto position of the zoom lens according to the current embodiment.

TABLE 5

| Variable distance | Wide-angle position | Middle angle position | Telephoto angle position |
|---|---|---|---|
| D1 | 1.000 | 4.596 | 9.045 |
| D2 | 9.145 | 5.550 | 1.100 |
| D3 | 7.834 | 5.690 | 3.000 |
| D4 | 3.283 | 5.428 | 8.117 |

Table 6 shows the aspherical coefficients of the zoom lens according to the present embodiment.

TABLE 6

| aspherical coefficient | S5 | S6 | S8 | S13 | S21 |
|---|---|---|---|---|---|
| K | −1.06856E+00 | 2.30176E−01 | 1.00000E+00 | 4.93082E−02 | 1.07734E+00 |
| A | −1.70170E−05 | −3.99223E−05 | −6.11718E−05 | −2.46754E−04 | −4.09098E−04 |
| B | 1.93998E−06 | 2.96082E−06 | −9.04138E−07 | 1.96009E−06 | 4.01964E−06 |
| C | −6.88104E−08 | −1.15986E−07 | 3.72587E−07 | −2.92973E−07 | −6.34594E−07 |
| D | 1.52978E−09 | 2.22699E−09 | 0.00000E+00 | 1.51983E−08 | 1.93029E−08 |

Figure 10:
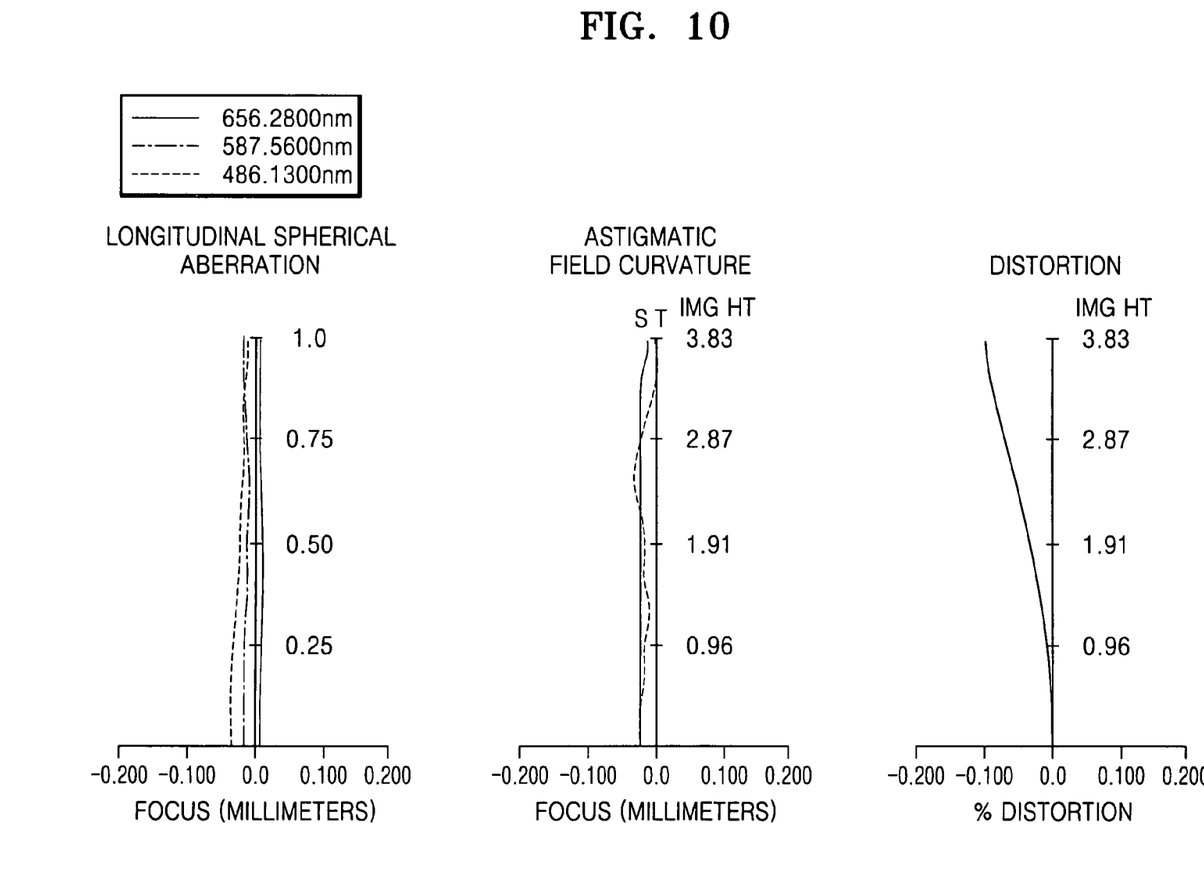
FIGS. 10, 11 and 12 illustrate the spherical aberration astigmatic, astigmatic field curvature, and distortion at a wide-angle position, a middle angle position and a telephoto position of the zoom lens of FIG. 9, respectively.
Figure 11:
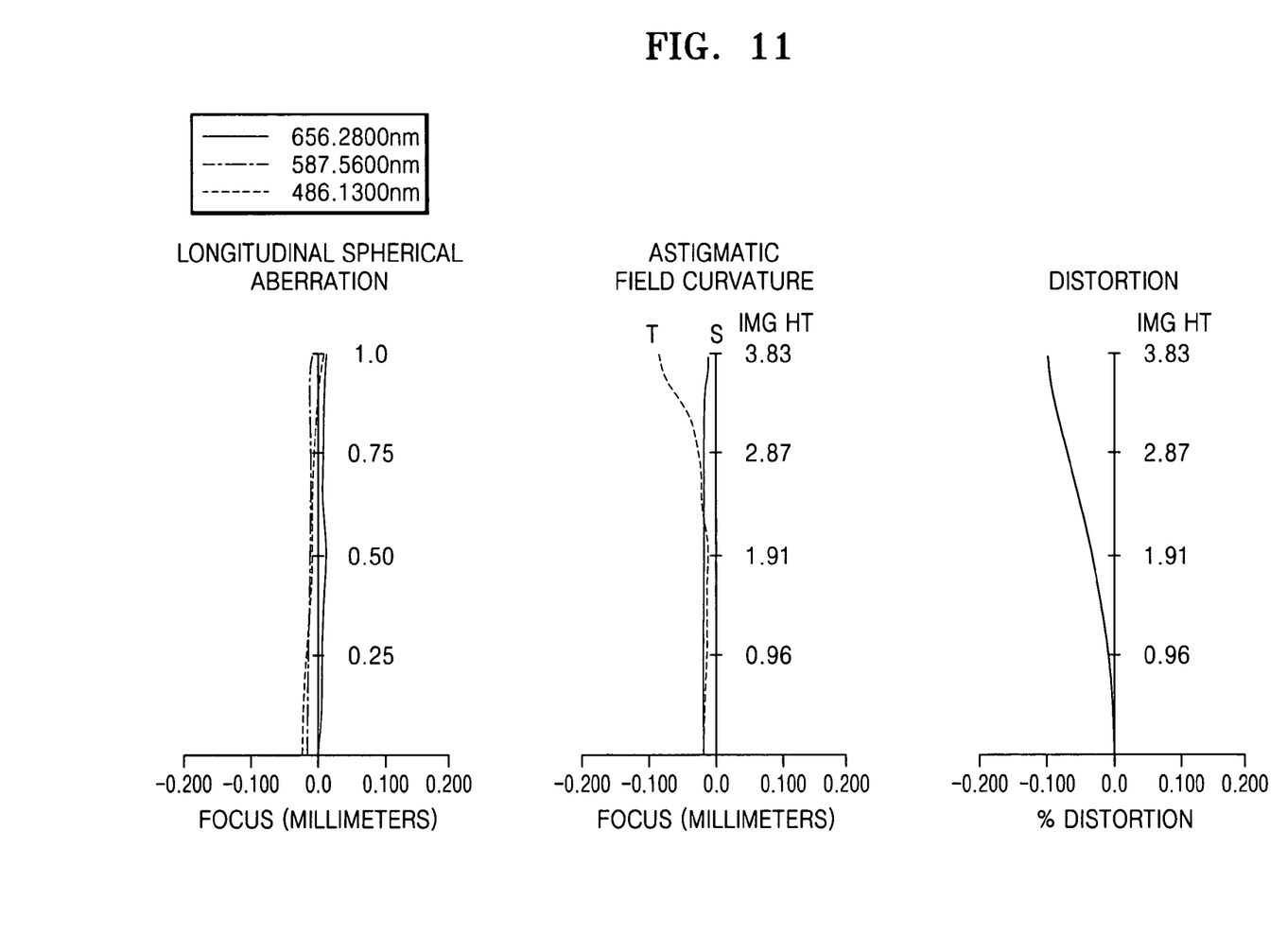
Figure 12:
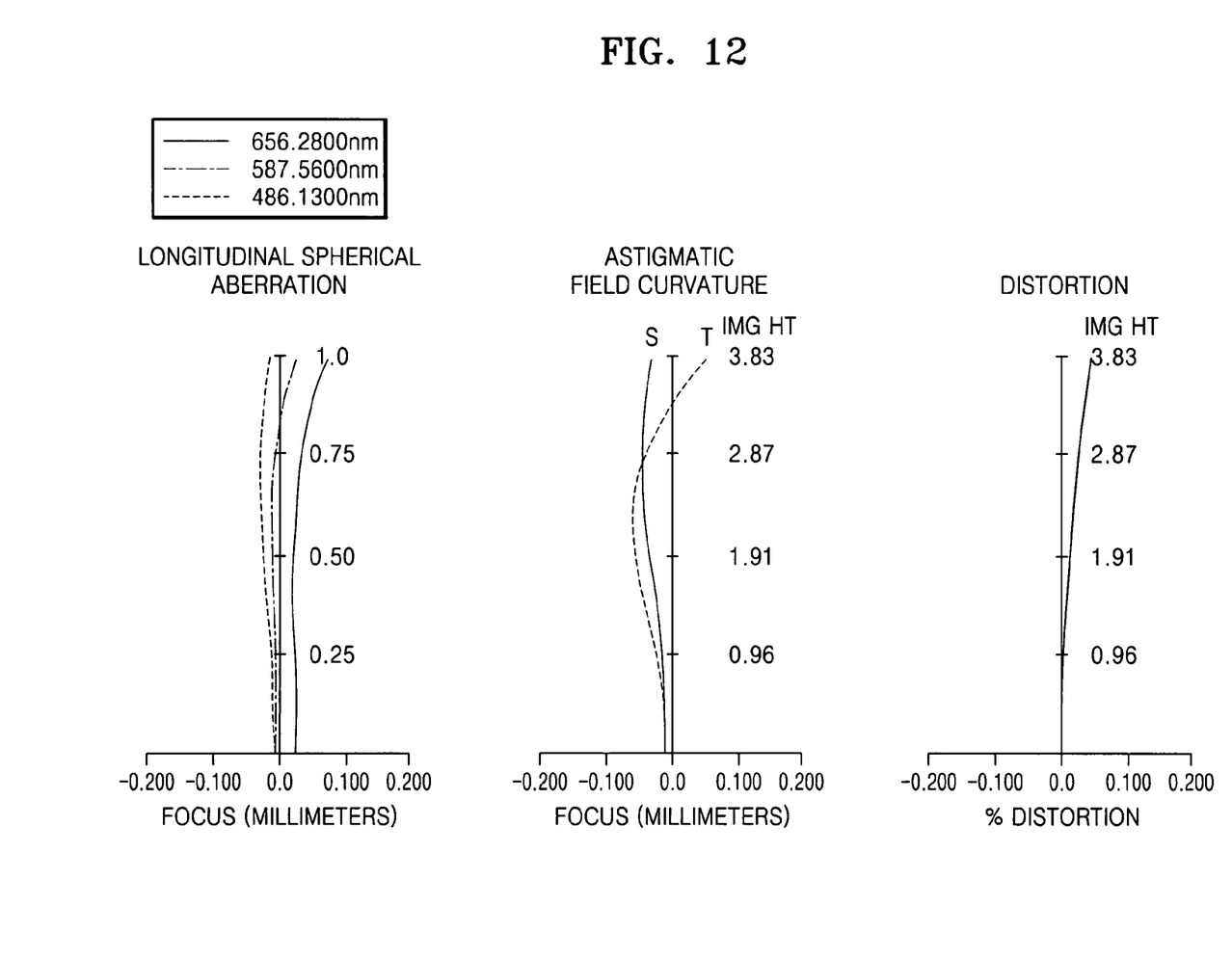

FIGS. 10, 11 and 12 illustrate the spherical aberration, astigmatic field curvature, and distortion at a wide-angle position, a middle angle position and a telephoto position of the zoom lens of FIG. 9, respectively.

Table 7 shows that the above embodiments satisfy the conditions of the above Inequalities 1 and 2.

TABLE 7

| | Inequality 1 | Inequality 2 |
|---|---|---|
| Embodiment 1 | 1.43 | −1.045 |
| Embodiment 2 | 1.349 | −1.557 |
| Embodiment 3 | 1.359 | −1.878 |

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A zoom lens system comprising:
a first lens group including at least one reflective optical member changing the optical path of an incident light ray, and having positive refractive power;
a second lens group having negative refractive power;
a third lens group having positive refractive power; and
a fourth lens group having positive refractive power, wherein
the first, second, third and fourth lens groups are sequentially arranged from the object side,
during a magnification change from a wide-angle position to a telephoto position, the first lens group and the third lens group are not moved, the second lens group is moved from the object side towards an image side, and the fourth lens group is linearly moved from the image side towards the object side;
the fourth lens group comprises a lens having negative refractive power, a lens having first positive refractive power, and a lens having second positive refractive power, wherein the lens are sequentially arranged from the object side;
the fourth lens group is configured so that the lens having negative refractive power and the lens having first positive refractive power are cemented as a doublet lens; and
the zoom lens system satisfies the following condition, $1.34 < R1/R2 < 1.44$, where
R1 is the radius of curvature of the first surface of the lens having negative refractive power from the object side, and
R2 is the radius of curvature of the second surface of the lens having negative refractive power from the object side.

2. The system of claim 1, wherein the fourth lens group performs focusing that is required due to the change in a distance between the object and the zoom lens system.

3. The system of claim 1, wherein a first lens from the image side in the fourth lens group is a plastic aspherical lens.

4. The system of claim 1, wherein the third lens group includes an aperture stop at the object side.

5. The system of claim 1, wherein the third lens group is moved in a direction perpendicular to the optical axis to perform shake correction.

6. The system of claim 5, wherein the fourth lens group performs focusing required due to the distance between the object and the zoom lens system.

7. The system of claim 5, wherein a first lens from the image side in the fourth lens group is plastic aspherical lens.

8. The system of claim 5, wherein the third lens group includes an aperture stop at the object side.

9. A zoom lens system comprising:
a first lens group including at least one reflective optical member changing the optical path of an incident light ray, and having positive refractive power;
a second lens group having negative refractive power;
a third lens group having positive refractive power; and
a fourth lens group having positive refractive power, wherein
the first, second, third and fourth lens groups are sequentially arranged from the object side,
during a magnification change from a wide-angle position to a telephoto position, the first lens group and the third lens group are not moved, the second lens group is moved from the object side towards an image side, and the fourth lens group is linearly moved from the image side towards the object side;
the fourth lens group comprises a lens having negative refractive power, a lens having first positive refractive power, and a lens having second positive refractive power, wherein the lens are sequentially arranged from the object side;
the fourth lens group is configured so that the lens having negative refractive power and the lens having first positive refractive power are cemented as a doublet lens; and
the zoom lens system satisfies the following condition, $-1.88 < f10/f1011 < -1.04$ where f10 is the focal length of a first lens from the object side of the doublet lens in the fourth lens group, and f1011 is the focal length of the double lens in the fourth lens group.

* * * * *